(12) United States Patent
Brady et al.

(10) Patent No.: US 8,963,984 B2
(45) Date of Patent: Feb. 24, 2015

(54) VIDEOCONFERENCING SYSTEM USING QR CODES FOR INTERACTION

(75) Inventors: Thomas Quentin Brady, Austin, TX (US); William Everett Hiller, Austin, TX (US); Dovev Liberman, Hod Ha Sharon (IL)

(73) Assignee: Polycom, Inc., San Jose, CA (US)

( * ) Notice: Subject to any disclaimer, the term of this patent is extended or adjusted under 35 U.S.C. 154(b) by 549 days.

(21) Appl. No.: 13/329,472

(22) Filed: Dec. 19, 2011

(65) Prior Publication Data
US 2013/0155173 A1    Jun. 20, 2013

(51) Int. Cl.
     *H04N 7/14*      (2006.01)
     *H04N 7/15*      (2006.01)
     *H04L 12/18*      (2006.01)
     *H04M 3/56*      (2006.01)

(52) U.S. Cl.
     CPC .............. *H04N 7/15* (2013.01); *H04L 12/1813* (2013.01); *H04M 3/567* (2013.01); *H04N 7/147* (2013.01); *H04N 2007/145* (2013.01); *H04L 12/1822* (2013.01)
     USPC ................... 348/14.03; 348/14.04; 348/14.08; 348/14.11; 370/259; 370/260; 379/202.01; 455/556.1

(58) Field of Classification Search
USPC ..................... 348/14.01–14.16; 370/259–271, 370/351–357; 709/201–207, 217–248; 455/412.1–426.2, 456.1–466, 455/550.1–560, 575.1–575.9, 90.1–90.3
See application file for complete search history.

(56) References Cited

U.S. PATENT DOCUMENTS

| | | | |
|---|---|---|---|
| 6,389,182 B1 | 5/2002 | Ihara et al. | |
| 7,325,033 B2 | 1/2008 | Thornton | |
| 7,419,097 B2 * | 9/2008 | Lee et al. | 235/462.11 |
| 7,920,158 B1 | 4/2011 | Beck et al. | |
| 7,920,159 B2 | 4/2011 | Ueno et al. | |
| 2005/0015444 A1 * | 1/2005 | Rambo | 709/204 |
| 2005/0031092 A1 * | 2/2005 | Umemura et al. | 379/88.13 |
| 2007/0208805 A1 | 9/2007 | Rhoads et al. | |
| 2009/0117883 A1 | 5/2009 | Coffing et al. | |
| 2009/0288159 A1 * | 11/2009 | Husemann et al. | 726/16 |
| 2010/0088372 A1 | 4/2010 | Shridhar et al. | |
| 2011/0016204 A1 * | 1/2011 | Wiener et al. | 709/224 |
| 2011/0249081 A1 | 10/2011 | Kay et al. | |
| 2012/0023167 A1 * | 1/2012 | Hovdal et al. | 709/204 |

* cited by examiner

*Primary Examiner* — Hemant Patel
(74) *Attorney, Agent, or Firm* — Wong, Cabello, Lutsch, Rutherford & Brucculeri, LLP

(57) ABSTRACT

Quick Response barcodes ("QR Codes") are used for videoconferencing between a peripheral device and a videoconferencing system, which can include a conferencing server and/or a videoconferencing unit. Conferencing related QR codes are embedded within video frames and are identified by either a peripheral device or a videoconferencing unit. Once identified, the device or unit acts according to the information provided by the QR code. The QR codes enables the peripheral device, videoconferencing unit, and conferencing server to operation in conjunction with one another even though one or more of the device may not share a compatible operation platform that would allow for direct communication of requests and responses.

28 Claims, 6 Drawing Sheets

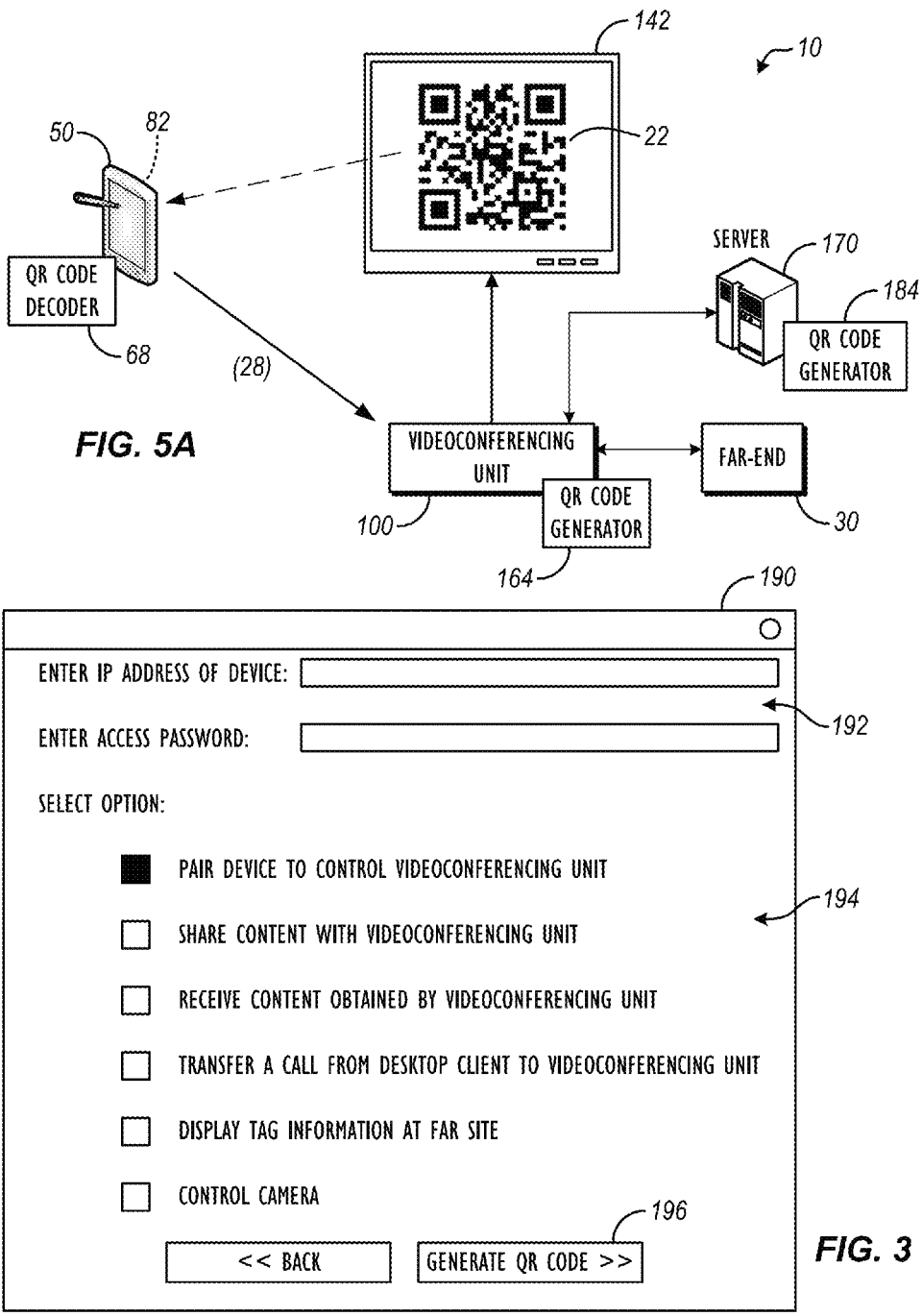

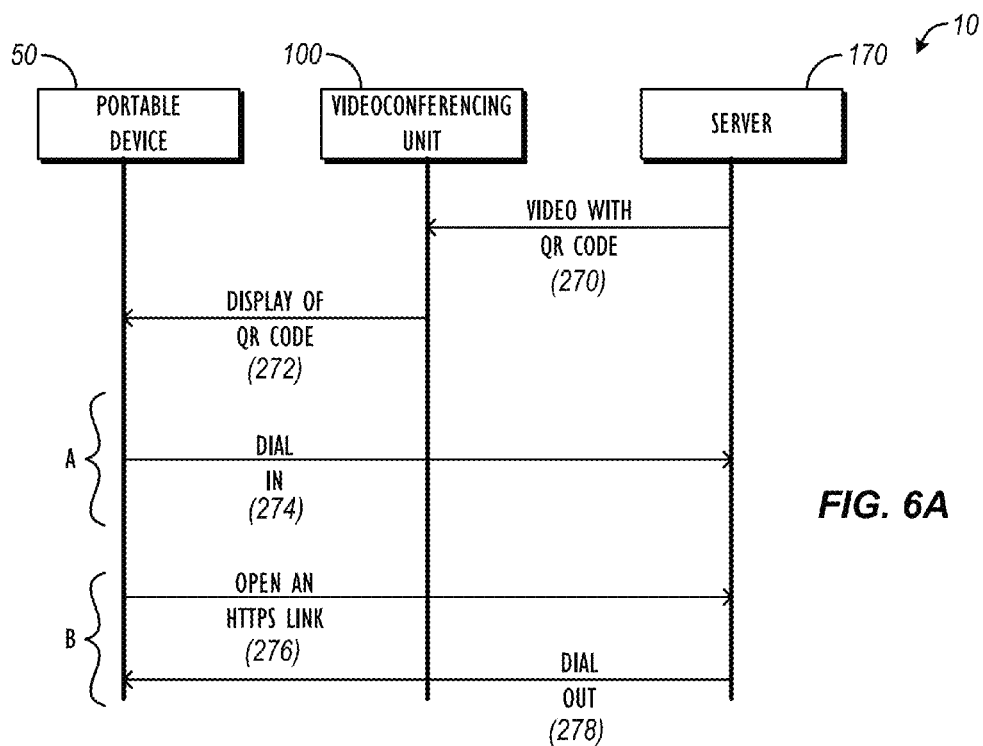
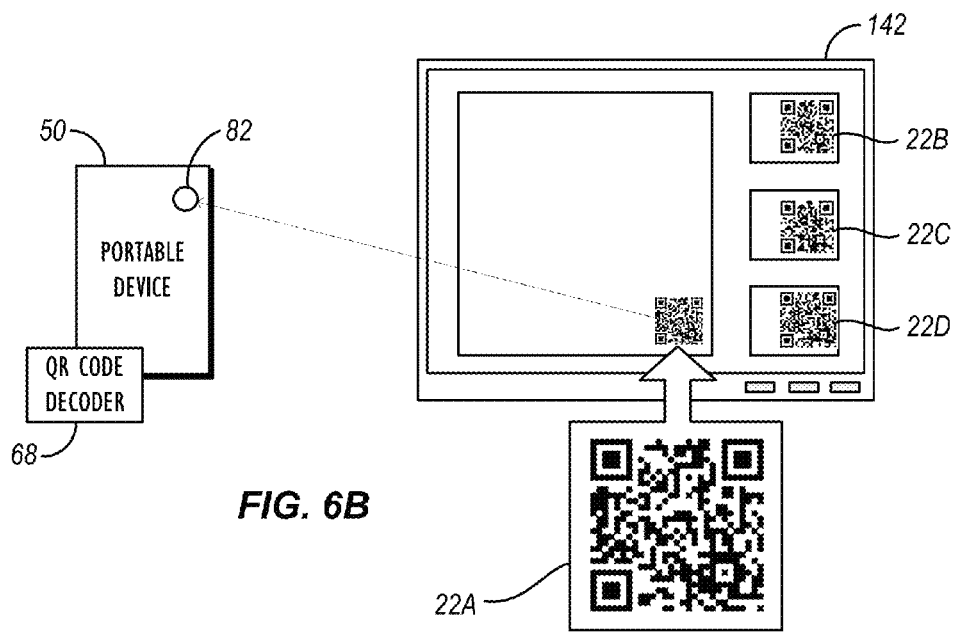

VIDEOCONFERENCING SYSTEM USING QR CODES FOR INTERACTION

BACKGROUND OF THE DISCLOSURE

Users may want to perform a number of operations during a videoconference, but they may be limited in their ability to do so because they lack a device that can communicate with a particular videoconferencing unit. For example, a user during a videoconference may want to pair a computer with the videoconferencing unit so the user can display content without installing software or connecting to another device. In another example, the user may want to display content on the user's computer, or perform advanced interactions with the videoconferencing unit without using the conventional remote control. Unfortunately, users today need to either install special software on a computer or physically connect to another device to do these and other operations with a videoconferencing unit.

The subject matter of the present disclosure is directed to overcoming, or at least reducing the effects of, one or more of the problems set forth above.

SUMMARY OF THE DISCLOSURE

Optical machine-readable data representations (e.g., barcodes, matrix barcodes, or Quick Response barcodes a.k.a. "QR codes") are used for videoconferencing between a peripheral device and a videoconferencing system, which can include a conferencing server and/or a videoconferencing unit (e.g., endpoint). The peripheral device may lack the ability to directly interact with a videoconferencing unit or other aspects of the system so that conferencing-related QR codes are used to communicate commands, instructions, requests and the like between the peripheral device and videoconferencing unit.

For example, conferencing-related QR codes are embedded within video frames and are identified by either a peripheral device or a videoconferencing unit. Once identified and decoded, the device or unit acts according to the information provided by the QR code. Thus, the QR codes can be used in two directions: (a) from a videoconferencing unit to a peripheral device or (b) from the peripheral device to the videoconferencing unit.

To communicate the QR code from the videoconferencing unit to the peripheral device, for example, the unit embeds the QR code into one or more video frames output to the unit's display. The QR code can be generated by a remote conferencing server and transmitted to the unit, or the QR code can be generated directly at the unit. The peripheral device is then used to capture an image of the displayed video having the QR code, and the peripheral device decodes the QR code and extracts the encoded information to perform a desired action.

To communicate the QR code from the peripheral device to the videoconferencing unit (and to the remote server if applicable), the peripheral device can obtain the QR code from a remote server, such as a web-based server having a code generator. When the peripheral device obtains the QR code, the device displays the QR code on its screen. The displayed code can then be held in front of the videoconferencing unit's camera, which captures video of the QR code. The unit then decodes the QR code and extracts the encoded information so the unit can then respond accordingly.

The foregoing summary is not intended to summarize each potential embodiment or every aspect of the present disclosure.

BRIEF DESCRIPTION OF THE DRAWINGS

FIG. 3 shows a user interface screen accessible by the user's peripheral device on the web server of the system.

FIG. 5A shows a first arrangement of the videoconferencing system when a peripheral device seeks to interact with the near-end videoconferencing unit.

FIG. 6A shows a video monitor of a videoconferencing unit displaying a QR code in a frame of a layout for capture by a camera of a peripheral device.

FIG. 6B shows a process flow of communications between a peripheral device, videoconferencing unit, and server.

DETAILED DESCRIPTION OF THE DISCLOSURE

Figure 1A:
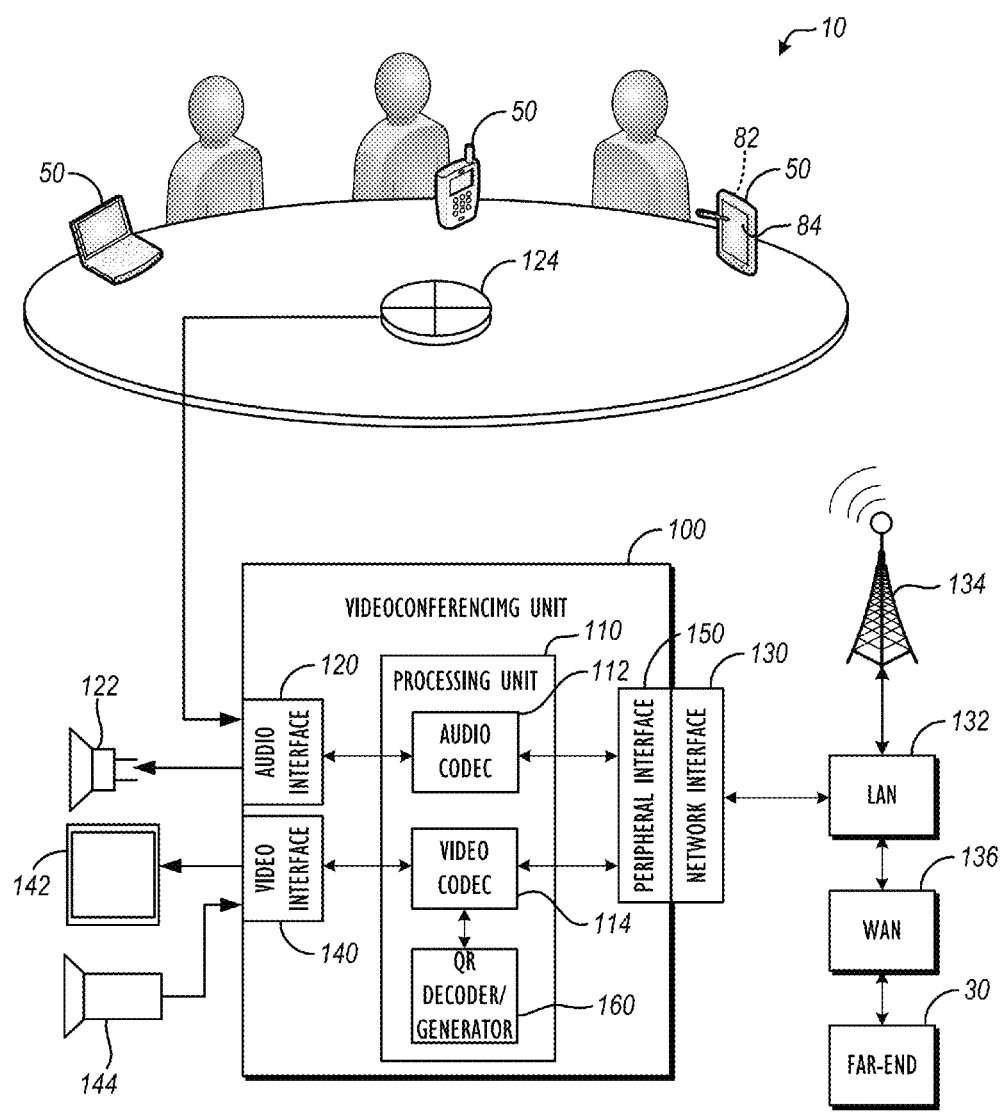
FIG. 1A schematically illustrates a videoconferencing system according to the present disclosure.

A videoconferencing system 10 according to the present disclosure illustrated in FIG. 1 has a videoconferencing unit 100 with a loudspeaker 122 coupled to an audio interface 120. As is typical, the unit 100 can use an individual microphone 20, microphone pod, ceiling microphone, or other device coupled to the audio interface 120 for audio. The system 10 also has a display 142 and a camera 144 coupled to a video interface 142.

Internally, the videoconferencing unit 100 has a processing unit 110 with an audio codec 112 and a video codec 114 respectively connected to the audio and video interfaces 120 and 140 for encoding and decoding audio and video for the conference. Finally, the unit 100 has a network interface 130 connected to the codecs 112 and 114 for communicating audio and video between the near-end unit 100 and far-end units 30.

Figure 1B:
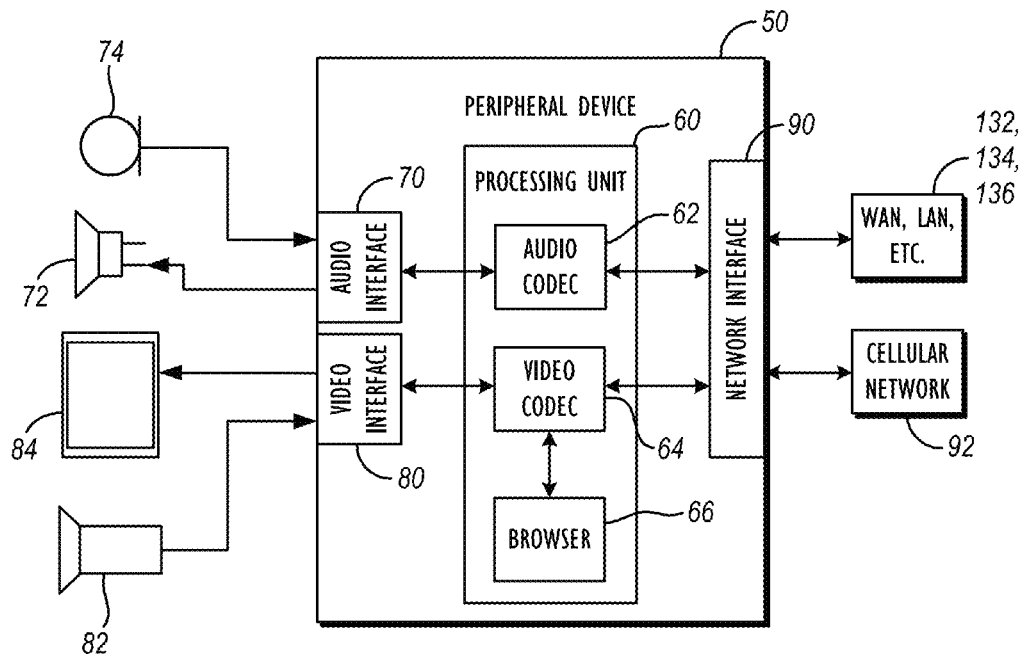
FIG. 1B schematically illustrates a peripheral device for use with the disclosed system.

The unit's network interface 130 in FIG. 1A can connect to the far-end unit 30 via an Ethernet connection, a wireless connection, an Internet connection, a POTS connection, or any other suitable connection for videoconferencing or combination thereof. As part of the network interface 130 or separate therefrom, the unit 100 includes a peripheral interface 150 that enables the videoconferencing unit 100 to communicate with local peripherals, such as the peripheral devices 50. For example, the network interface 130 can connect the unit 100 to a local intranet of a LAN 132, which can connect in turn to a WAN 136, such as the Internet. The LAN 132 may have a wireless local area network (WLAN), Wi-Fi network, personal area network (PAN) (e.g., Bluetooth), or similar type of wireless network 134. Participants can connect their peripheral devices 50 with the wireless network 134 to the local intranet so transport between the peripheral devices 50 and the videoconferencing unit 100 can use the wireless network 134 and the LAN 132.

During a videoconference, many of the participants would likely have their own peripheral device 50 available. In general, the peripheral device 50 can include any of a number of available devices, including, but not limited to, peripheral devices, cellular telephones, smartphones, tablet PCs, touch screen PCs, PDAs, hand-held computers, mini-laptop computers, laptop computers, and the like. As briefly shown in FIG. 1B, the peripheral device 50 typically has a processing unit 60, memory (not shown), and a network interface 90 for connecting the peripheral device 50 to a network, such as a WAN, Internet, etc. (132, 134, 136), and even to a cellular network 92. Depending on the device, the processing unit 60 can have an audio interface 70 for coupling to a loudspeaker 72 and a microphone 74 and can have a video interface 80 for coupling to a camera 82 and a display 84. A browser or other user interface application 66 runs on the processing unit 60 so a user of the device 50 can interact remotely with servers, computers, and other machines via the network connection.

Having the understanding of the videoconferencing system 10, discussion now turns to how the system 10 can use optical machine-readable data representations (e.g., barcodes, matrix barcodes, or Quick Response barcodes) to transfer information and instructions between the videoconferencing unit 100, peripheral device 50, and far-end 30. As will be appreciated, the peripheral device 50 used in a videoconferencing environment may lack specific software to communicate information with the videoconferencing unit 100 so that the peripheral device 50 may lack the ability to directly interact with the videoconferencing unit 10 or other aspects of the system 10.

To overcome this inability of the peripheral device 50, the system 10 uses optical machine-readable data representations to exchange information between the peripheral device 50 and the videoconferencing unit 100. Preferably, the data representations used are matrix or Quick Response barcodes (i.e., QR codes), although any type of barcode can be used. When exchanging information with the QR codes, the peripheral device 50 can interact with, operate in conjunction with, or cooperate in a videoconference with the videoconferencing unit 100 in a number of ways—some of which are discussed below—without needing the necessary software to interface directly with the videoconferencing unit 100.

Briefly, QR codes are two-dimensional barcodes that use dark and light modules arranged in a square to encode data for being optically captured and read by a machine. Elements of the barcode define the version, format, position, alignment, timing, etc. to enable reading and decoding of the barcode. The remainder of the barcode can encode various types of information in any type of suitable format, such as binary, alphanumeric, etc., and the QR barcode can be based on any of a number of standards.

Figure 2A:
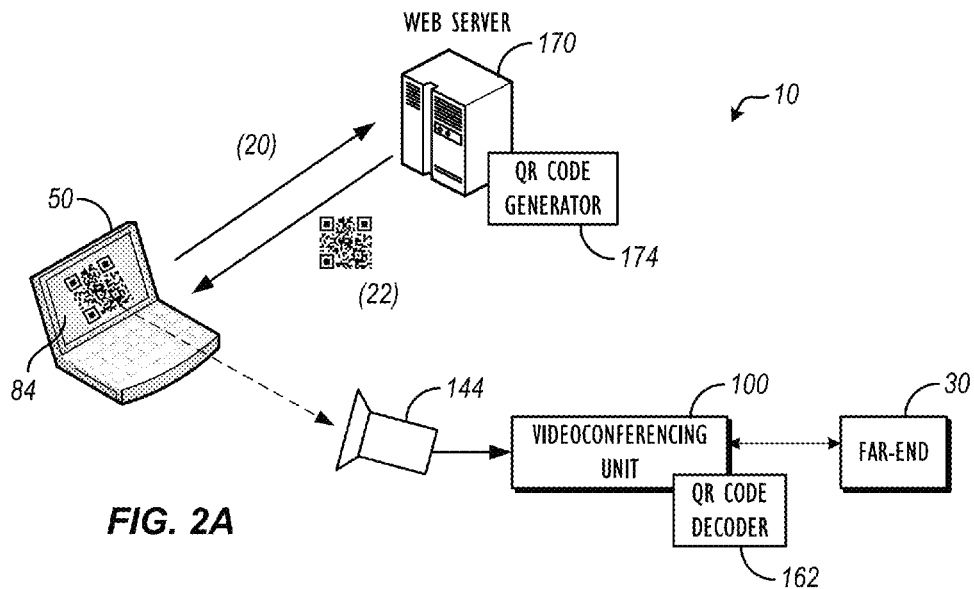
FIG. 2A shows a first arrangement of the videoconferencing system when a peripheral device seeks to interact with the near-end videoconferencing unit.

FIG. 2A shows a first arrangement of the videoconferencing system 10 where a peripheral device 50 seeks to interact with or operate in conjunction with the near-end videoconferencing unit 100 in a videoconference. In this arrangement, the peripheral device 50 cannot communicate directly with the videoconferencing unit 100 because the device 50 may lack specific software applications to enter information and communicate the information with the videoconferencing unit 100. Instead of having to download some particular application, the peripheral device 50 communicates with a remote server 170 via a network connection to obtain a particular QR code 174, which can then be displayed by the device 50 to communicate with the videoconferencing unit 100. In other words, the peripheral device 50 can access applications, user interface, and the like on the server 170 via the Internet so generate a QR code 174 that encodes data of a particular request. In the context of the present disclosure, the features of the QR code 174 generated by the web server 170 meet the requirements (standard, format, etc.) associated with the videoconferencing unit 100 so the unit 100 can decode the encoded data and respond to the particular request.

Figure 1C:
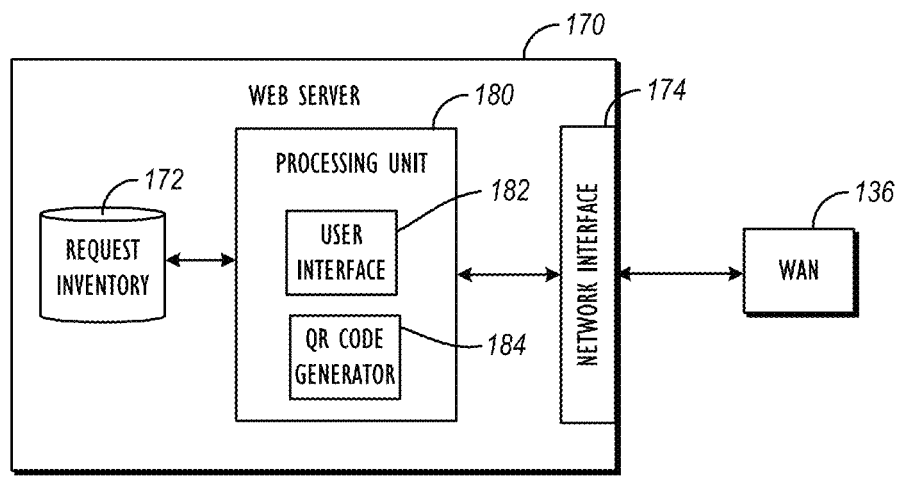
FIG. 1C schematically illustrates a web server for use with the disclosed system.

As shown briefly in FIG. 1C, the server 170 has a network interface 174 for communicating with a network 136, such as the WAN, Internet, etc. Internally, the server 170 has a processing unit 180 and memory 172, among other common components not described here. During operation, a user interface application 182 operates on the processing unit 180 to provide web pages and other interface items for peripheral devices 50 via the network connection 174.

The memory 172 stores an inventory of requests that a user can access from a peripheral device (50) or the videoconferencing unit (100) via the user interface application 182. These requests include the data for encoding information, instructions, commands, and the like in the QR code to be generated in response to a user's entries via the user interface. Working together with the user interface application 182, a QR code generator 184 operating on the processing unit 80 generates QR codes in response to the requests made by peripheral devices (50) through the user interface 182 and network connection 174. Finally, the server 170 sends the request to either the peripheral device (50) or videoconferencing unit (100) via the network interface 174 and the network 136.

Figure 2B:
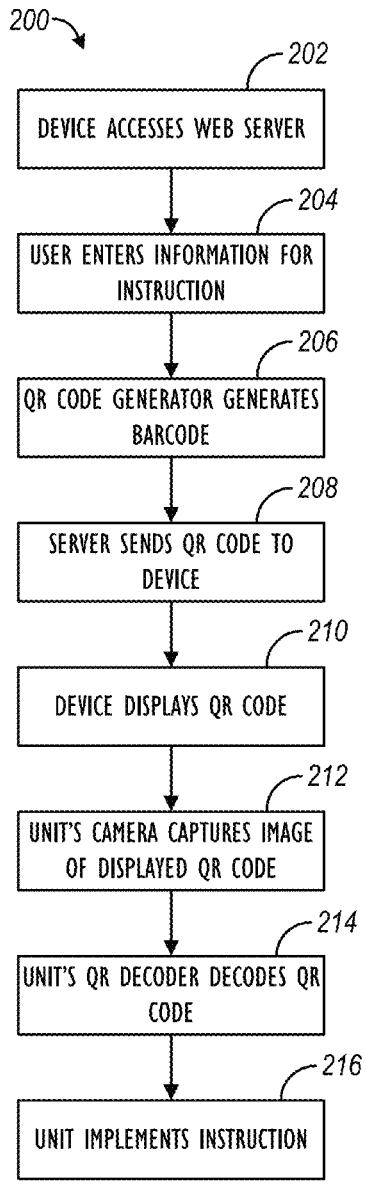
FIG. 2B shows operation of the arrangement in FIG. 2A.

Looking concurrently at FIG. 2B, the process of generating QR codes and communicating them to the videoconferencing unit 100 in the arrangement of FIG. 2A first involves a user of the device 50 accessing the web server 170 using a web browser or other comparable interface 66 (Block 202). Connected with server 170, the user submits information 20 to the web server 170 (Block 204). As detailed below, the information 20 can include requests, commands, instructions, and the like. (FIG. 3 discussed below shows an example user interface screen accessible by the user's peripheral device 50 on the web server 170 of the system 10.)

At the web server 170, the QR code generator 184 generates a QR code 22 using the submitted information 20 in response to the user's request (Block 206). Because a number of formats can be used and information can be embedded in a number of ways, the QR Code generator 184 generates the QR code 22 in the specific format required by the videoconferencing unit 100 or other device intended to decode the QR code 22.

This generated QR code 22 is then returned to the peripheral device 50 (Blocks 208, 210), and the device 50 displays the QR code 22 on its display 84. For example, the web server 170 can have a built in applet that can transmit the QR code 22 as a screen share capture for display on the peripheral device 50. Thus, the QR code 22 can be transmitted in an image file format for display in the web browser or other user interface of the device 50. In general, the QR code 22 can simply be incorporated into a user interface screen of the server 170 and displayed as an image on the device's display 84 while connected with the web server 170, or the device 50 can download the QR code 22 for independent display on the device 50 using an existing program for displaying images or video.

While displaying the QR code 22 on the display 84, the user then places the display 84 in front of the unit's camera 144, which captures the image of the QR code 22 (Block 212). Internally, the unit 100 has a QR code decoder 162 that first detects the QR code 22 captured by the camera 144 and then decodes the QR code 22 to determine the information embedded therein (Block 214). (The particular details of detecting and decoding a QR code are known in the art and are not detailed here.) Depending on the decoded information, the videoconferencing unit 10 then responds by implementing an instruction, command, response, or other action (Block 216).

As noted above, a user accesses the web server 170 as in FIGS. 2A and 2B to generate a QR code 22 so the user can perform a number of operations with the user's peripheral device 50 to interact or cooperate in a videoconference. As an example, FIG. 3 shows a user interface screen of a web page 190 on the server (170) accessible by the user's peripheral device (50). The user pulls up the web page 190 on her device (50) and selects what information/instruction/request to include in a QR code to be generated by the server's QR code generator (172).

As shown, the user can enter required information 192 to connect the device 50 with the videoconferencing system 100. For example, the user may need to enter the IP address of the device (50) and some particular password or the like so this information can be embedded in the QR code generated. The user can then select particular information 194 to be embedded in the QR code and sent to the videoconferencing unit (100). A number of items of information 194 can be selected—a few of which are briefly discussed below.

The items of information 194 can include, but are not limited to the following items. First, the user can select to pair the peripheral device (50) with the videoconferencing unit (100) so the device (50) can be used to control the unit (100) (or at least interact with or operate in conjunction with the unit 100). In a second item, the user can select to share content on the peripheral device (50) with the videoconferencing unit (100) and to obtain content on the device (50) from the unit (100) that the unit (100) is receiving. In other items, the user can transfer a call from a desktop client operating on the device to the videoconferencing unit (100), or the user may want to identify herself with a nametag so the videoconferencing unit can display the user's name to the far-end (30).

Other items can allow the peripheral device (50) to control the unit (100) by bypassing the complex controls typically associated with a videoconferencing unit. For example, the user can select to switch cameras, change screen display layouts, control the pan-tilt-zoom camera of the unit, etc. As a final example, an item can allow the user to make herself active speaker to the far-end (30) in the videoconference being conducted. As will be appreciated, these and other commands and information can be embedded in the generated QR code to send to the peripheral device (50).

Figure 4A:
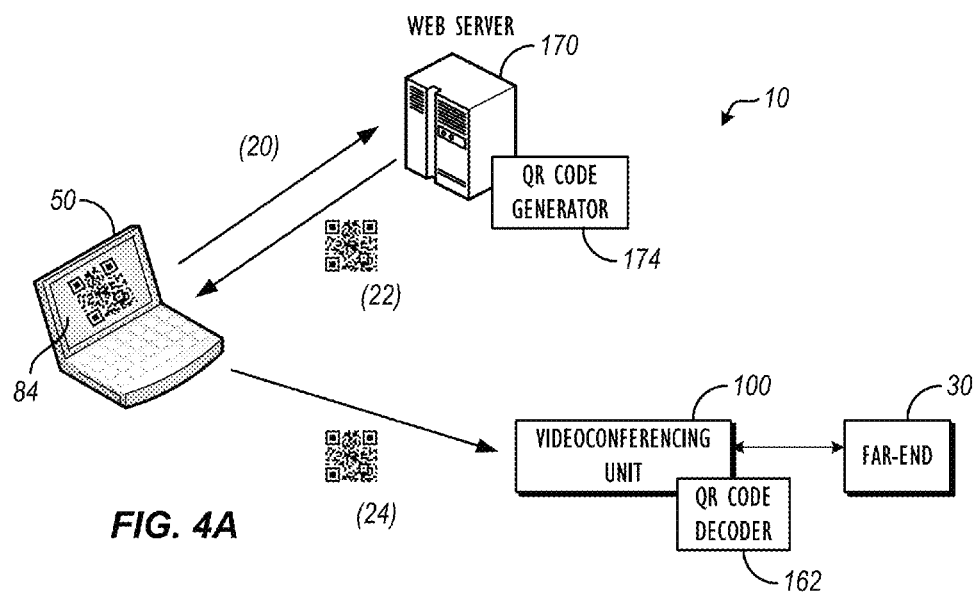
FIG. 4A shows a first arrangement of the videoconferencing system when a peripheral device seeks to interact with the near-end videoconferencing unit.
Figure 4B:
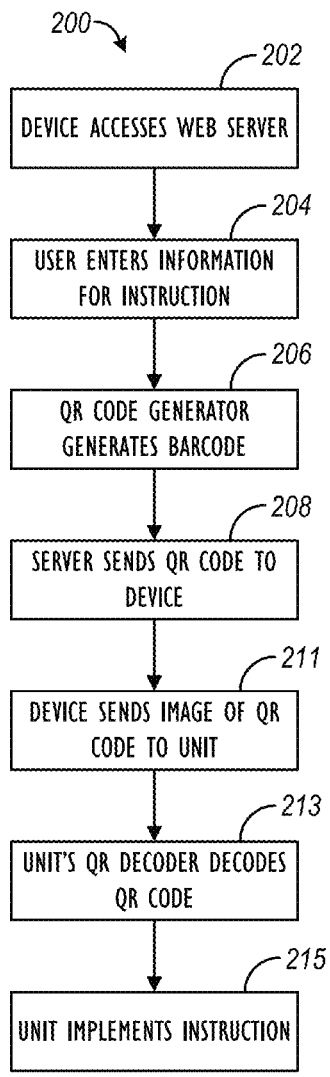
FIG. 4B shows operation of the arrangement in FIG. 4A.

FIG. 4A shows another arrangement of the videoconferencing system 10 where a peripheral device 50 again seeks to interact with or operate in conjunction with a near-end videoconferencing unit 100. Again, in this arrangement and as shown in the process of FIG. 4B, the peripheral device 50 communicates with the remote web server 170 via a network connection (Block 202), submits information 20 to the web server 170 (Block 204), and receives the QR code 22 from the QR code generator 184 at the server 170 (Block 206). Here, the QR code 22 is preferably returned to the device 50 as a file having a compatible format so the device 50 can download and store the file having the code 22. When the server 170 sends the QR code 22 to the device 50, for example, the code 22 can be sent as an image, frame, or video file.

Instead of the videoconferencing system 100 using its camera 144 to obtain an image of the QR code 22, the device 50 sends a file 24 of the QR code 22 directly to the unit 100 as an image, frame, or video (Block 211). Sending the code file 24 directly to the unit 100 in this way can be accomplished by using a physical connection (i.e., USB cable connection) or by physically uploading of the file 24 for the code 22 to memory on the unit 100. Physical transfer of the file 24 may be necessary if the device 50 does not have a display or cannot communicate wirelessly with the videoconferencing unit 100 because the device 50 lacks compatible software applications, a wireless network connection, or the like.

If other forms of communication are available, however, the device 50 can send the file 24 for the QR code 22 using a text message, e-mail, instant message, Bluetooth connection, Wi-Fi connection, etc. Once received, the unit's QR code decoder 162 decodes the information embedded in the QR code 22 in the file 24 (Block 213) so the unit 100 can then implement the request, instruction, command, etc. contained in the information.

Figure 5B:
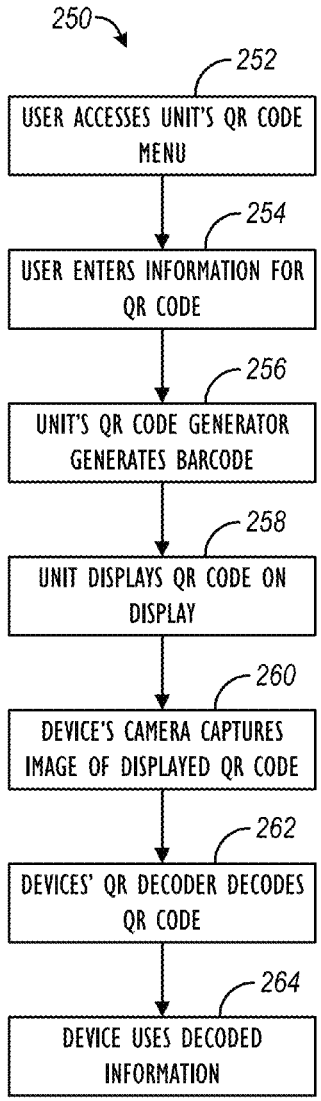
FIG. 5B shows operation of the arrangement in FIG. 5A.

In previous arrangements, the peripheral device 50 accessed a remote web server 170 so an appropriate QR code 22 could be generated. In an alternate arrangement shown in FIG. 5A, the videoconferencing unit 100 generates a QR code 22 that can transfer information to the peripheral device 50. Looking concurrently at the process of FIG. 5B, a user at the videoconferencing unit 100 accesses a QR code menu (not shown) on the unit 100 (Block 252). Various menus can be provided that allow the user to enter information for generating an appropriate QR code 22, and the menus can be similar to the user interface web page 190 (Block 254). Using the entered information, the unit's QR code generator 164 generates an appropriate QR code 22 (Block 256), which is then displayed on the unit's monitor 142 and/or is sent to the far-end 30 for display (Block 258).

A participant at the near-end and/or the far-end can use his device's camera 82 to capture an image of the displayed QR code 22 (Block 260). The device's QR code decoder 68 decodes the captured code to determine the information it contains (Block 262). In the end, the device 50 can then use the decoded information for the desired operation, such as connecting to the videoconferencing unit 100 (Block 264).

FIG. 6A shows a process of communications between a peripheral device 50, a videoconferencing unit 100, and a server 170, and FIG. 6B shows a video monitor 174 of a videoconferencing unit 100 displaying QR codes 22A-22D in a frame of a screen layout. Initially, the server 170 generates a QR code 22 and incorporates it into one or more frames of the video sent to the videoconferencing unit 100 (Step 270). (As noted herein, the sever 170 can be a web-based server or a multi-point control unit.) In turn, the videoconferencing unit 100 displays the QR code 22 in video frames in the screen layout on the unit's monitor 142 (Step 272). For example, the monitor 142 in FIG. 6B shows a screen layout having several video sections. The sections display different QR codes 22A-D for capture by a peripheral device 50. Preferably, the QR codes 22A-D displayed by the unit's monitor 142 are not visible to the human eye so the codes 22A-D can be displayed in specific or intermittent frames of the output video.

The various codes 22A-D can have details of participants of the videoconference displayed in the particular layout windows. Alternatively, the codes 22A-D can have information about the videoconferencing unit 100 and available conferences. When displayed on the monitor 142 of the unit 100, the codes 22A-D can allow a user with a peripheral device 50 to connect to one of the conferences.

As shown in FIG. 6B, for example, a participant with a peripheral device 50 captures the video displayed on the unit's monitor 142 with the peripheral device's camera 82. On the device 50, a conferencing application having a QR decoder 68 decodes the QR code 22A-22D and extracts the encoded information. If the QR code 22 is displayed on individual frames, the peripheral device's QR decoder 68 can detect the code 22A-22D on a per frame basis.

After decoding the QR code 22, the peripheral device 50 can perform a number of actions. In a first action (A) shown in FIG. 6A, for example, the peripheral device 50 can use the encoded information to join the videoconference by connecting or dialing in (Step 274). The encoded information can include multiple connection alternatives, such as H.323, SIP, PSTN, etc., for the device 50 to connect to the videoconference. The conferencing application 66 attempts the connection alternatives according to a pre-configured order. In this way, the QR code 22 provides an automatic way for the peripheral device 50 to join the conference.

Once the peripheral device 50 connects to the videoconference, the participant having the peripheral device 50 can leave the room where the videoconferencing unit 100 is located so the participant can roam during the conference. In this case, once the peripheral device 50 connects, the participant can disconnect the videoconferencing unit's connection with the far-end (30). These later operations can be done from the peripheral device's conferencing application.

Other than providing connection information, the QR codes 22 can provide the system 10 with several conferencing control features and other information. For example, participants can automatically obtain extra information by extracting the QR code 22 from a particular layout window. The information can include conference information (e.g., duration, list of parties, etc.) and can include the content information (e.g., source, title, etc.).

In another action (B) shown in FIG. 6A, the QR code 22 can contain information for accessing Hypertext Transfer Protocol over Secure Socket Layer (HTTPS) link, although a HTTP or other type of link may be used (Step 276). In decoding the QR code 22, the participant can use her device to access the link and send parameters to the server 170 (as a multipoint conferencing unit (MCU)) or to the far-end 30 that will be used for dial out (Step 278). In this way, the QR code 20 can contain a link that can send additional information to the endpoint, MCU, or other participant/device.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing method, comprising:
obtaining information indicative of a request of a first device to interact in a videoconference with a second device;
generating an optical machine-readable data representation encoding data of the request; and
making the optical machine-readable data representation available to the first device for decoding by the second device,
wherein the request is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

2. The method of claim 1, wherein the optical machine-readable data representation comrises a barcode, a matrix barcode, or a quick response barcode.

3. The method of claim 1, wherein the data decoded from the optical machine-readable data representation ellicits a response from the second device in accordance with the request.

4. The method of claim 1, wherein the first or second device is a videoconferencing unit; and wherein the other of the first or second device is selected from the group consisting of a peripheral device, a portable device, a cellular telephone, a smartphone, a tablet personal computer, a touch screen personal computer, a personal digital assistant, a hand-held computer, a netbook computer, and a laptop computer.

5. The method of claim 1, wherein obtaining the information indicative of the request comprises obtaining the information from the first device at a server.

6. The method of claim 5, wherein the server is a web-based server or a multipoint conferencing unit.

7. The method of claim 5, wherein obtaining the informaiton at the server comprises making a user interface of the server available to the first device, the user interface having a plurality of selections for the first device to interact in the videoconference with the second device.

8. The method of claim 5, wherein making the optical machine-readable data representation available to the first device comprises incorporating an image of the optical machine-readable data representation in a user interface screen of the server made available to the first device.

9. The method of claim 5, wherein making the optical machine-readable data representation available to the first device comprises transmitting a representation of the optical machine-readable data representation from the server to the first device.

10. A server, comprising:
a network interface;
a processing unit operatively coupled to the network interface, the processing unit configured to:
operatively communicate with a first device via the network interface, obtain information indicative of a request for the first device to interact in a videoconference with a second device, generate an optical machine-readable data representation encoding data of the request, and make the optical machine-readable data representation available to the first device via the network interface, wherein the request is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

11. A videoconferencing method, comprising:

submitting, from a first device to a server, information indicative of a request to interact the first device in a videoconference with a second device;

obtaining an optical machine-readable data representation from the server at the first device, the optical machine-readable data representation encoding data of the request; and making the optical machine-readable data representation available for decoding by the second device, wherein the request is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

12. The method of claim 11, wherein making the optical machine-readable data representation available for decoding by the second device comprises displaying the optical machine-readable data representation on a display of the first device for capture by a camera of the second device.

13. The method of claim 11, wherein making the optical machine-readable data representation available for decoding by the second device comprises sending a representation of the optical machine-readable data representation from the first device to the second device.

14. A first device, comprising:

a diplay;

a network interface operatively communicating with a server; and a processing unit operatively coupled to the display and the network interface, the processing unit configured to:

submit to the server information indicative of a request to interact the first device in a videoconference with a second device, obtain an optical machine-readable data representation from the server, the optical machine-readable data representation encoding data of the request, and make the optical machine-readable data representation available for decoding by the second device, wherein the request is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

15. The first device of claim 14, wherein the data decoded from the optical machine-readable data representation comprises multiple connection alternatives for the second device to connect to the videoconference.

16. The first device of claim 15, wherein the multiple connection alternatives are arranged in a preconfigured order of connection attempts for the second device.

17. The first device of claim 14, wherein the data decoded from the optical machine-readable data representation comprises information for the second device to access a hypertext transfer protocol link.

18. A videoconferencing method, comprising:

obtaining an image of an optical machine-readable data representation with a camera of a first device, the optical machine-readable data representation encoding information from a second device of a videoconference;

decoding at the first device the information of the videoconference from the optical machine-readable data representation; and responding with the first device to the decoded information, wherein the decoded information is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

19. A first device, comprising:

a camera; and a processing unit operatively coupled to the camera and configured to:

capture an image of an optical machine-readable data representation with the camera, the optical machine-readable data representation encoding information from a second device of a videoconference, decode the information of the videoconference from the optical machine-readable data representation, and respond to the decoded information, wherein the decoded information is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

20. The first device of claim 19, wherein the information comprises connection information for connecting the first device in the videoconference conducted by the second device; and wherein the first device further comprises a network interface for operatively communicating with the second device, wherein to respond to the decoded information, the processing unit is configured to connect the first device in the videoconference with the second device based on the connection information.

21. The first device of claim 19, wherein the information comprises content information of content of the videoconference conducted by the second device.

22. A videoconferencing method, comprising:
generating an optical machine-readable data representation encoding information of a videoconference conducted with a first device; and
making the optical machine-readable data representation for decoding by a second device by displaying the optical machine-readable data representation on a display associated with the first device,
wherein the encoded information is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

23. The method of claim 22, wherein the information of the videoconference comprises information of content of the videoconference conducted with the first device, connection information for connecting the second device to the videoconference, or information for the second device to access a hypertext transfer protocol link.

24. The method of claim 22, wherein displaying the optical machine-readable data representation on a display associated with the first device comprises incorporating the optical machine-readable data representation in intermittent frames of video output to the display associated with the first device.

25. A first device, comprising:
a display;
a network interface operatively connected to a videoconference; and
a processing unit operatively coupled to the display and and the network interface, the processing unit configured to:
generate an optical machine-readable data representation encoding information of the videoconference conducted with the first device, and
display the optical machine-readable data representation on the display for decoding by a second device,
wherein the encoded information is selected from the group consisting of a request to: pair the first device with the second device; control the second device with the first device; share content on the first device with the second device, transfer a call from a desktop client operating on the first device to the second device, identify a name tag for the second device to send to a far-end, switch cameras of the second device, change screen display layouts of the second device, control a pan-tilt-zoom camera of the second device, and make a participant of the first device active speaker in the videoconference.

26. The method of claim 11, wherein the optical machine-readable data representation comrises a barcode, a matrix barcode, or a quick response barcode; wherein the first or second device is a videoconferencing unit; and wherein the other of the first or second device is selected from the group consisting of a peripheral device, a portable device, a cellular telephone, a smartphone, a tablet personal computer, a touch screen personal computer, a personal digital assistant, a handheld computer, a netbook computer, and a laptop computer.

27. The method of claim 11, wherein the data decoded from the optical machine-readable data representation ellicits a response from the second device in accordance with the request.

28. The method of claim 11, wherein submitting, from the first device to the server, the information indicative of the request to interact the first device in the videoconference with the second device comprises making a user interface of the server available to the first device, the user interface having a plurality of selections for the first device to interact in the videoconference with the second device.

* * * * *